United States Patent [19]

Sakamoto

[11] Patent Number: 4,703,151
[45] Date of Patent: Oct. 27, 1987

[54] HEATING COOKING APPLIANCE HAVING WEIGHT DETECTING FUNCTION

[75] Inventor: Kazuho Sakamoto, Kyoto, Japan

[73] Assignee: Matsushita Electric Industrial Co., Ltd., Osaka, Japan

[21] Appl. No.: 817,745

[22] PCT Filed: Jul. 26, 1984

[86] PCT No.: PCT/JP84/00379
§ 371 Date: Dec. 23, 1985
§ 102(e) Date: Dec. 23, 1985

[87] PCT Pub. No.: WO85/03115
PCT Pub. Date: Jul. 18, 1985

[30] Foreign Application Priority Data

Jan. 5, 1984 [JP] Japan .......................................... 59-415
Feb. 20, 1984 [JP] Japan ...................................... 59-30531

[51] Int. Cl.$^4$ .............................................. H05B 6/68
[52] U.S. Cl. .............................. 219/518; 219/10.55 B; 219/10.55 F; 99/325; 177/210 FP; 177/245
[58] Field of Search ................... 219/10.55 B, 10.55 R, 219/10.55 E, 10.55 F, 518; 99/325; 177/245, 144, 185, 225, 210 FP, 210 EM

[56] References Cited

U.S. PATENT DOCUMENTS

| | | | |
|---|---|---|---|
| 3,545,555 | 12/1970 | Cass | 177/210 FP |
| 3,662,845 | 5/1972 | Pratt | 177/210 FP |
| 4,212,361 | 7/1980 | Stocker | 177/210 FP |
| 4,276,468 | 6/1981 | Nagamoto et al. | 235/92 T |
| 4,354,563 | 10/1982 | Lüchinger et al. | 177/210 EM |
| 4,418,774 | 4/1983 | Whitney et al. | 177/210 FP |
| 4,478,303 | 10/1984 | Boyles | 177/210 FP |
| 4,507,531 | 1/1985 | Teich et al. | 219/10.55 B |

FOREIGN PATENT DOCUMENTS

| | | | |
|---|---|---|---|
| 148124 | 7/1985 | European Pat. Off. | 219/10.55 B |
| 3047631 | 4/1982 | Fed. Rep. of Germany. | |
| 48-17754 | 3/1973 | Japan. | |
| 58-160742 | 9/1983 | Japan. | |
| 59-63426 | 4/1984 | Japan. | |
| WO83/01289 | 4/1983 | PCT Int'l Appl. | 219/10.55 B |

Primary Examiner—Philip H. Leung
Attorney, Agent, or Firm—Spencer & Frank

[57] ABSTRACT

A heating cooking appliance in which a Roberval mechanism, which produces a change in the vibration frequency in accordance with the weight of the food to be heated, is incorporated in a turntable, and the vibration of the turntable is transmitted to the outside of the heating chamber through a magnetic coupling using a magnet to detect a magnetic signal outside the heating chamber. In order to positively pick up the magnetic signal, a yoke is employed in the magnetic circuit and a detecting coil is arranged near the magnet by raising the heating chamber bottom plate, thereby tightening the magnetic coupling. Further, in order to eliminate electromagnetic wave noise, etc., a filter circuit is provided to ensure exact picking-up of the vibration signal. In order to avoid an influence on the magnetic signal of other magnetic field producing devices, the measurement is made either while such devices are not in operation or by using an added magnetic shielding means. Then, the weight of the food is calculated in accordance with the detected vibration frequency and the heating time, heating output and heating pattern are controlled in accordance with the calculated weight of the food. This cooking appliance is featured particularly in enhancing convenience of using the appliance and in realizing finely adjustable cooking.

3 Claims, 30 Drawing Figures

HEATING COOKING APPLIANCE HAVING WEIGHT DETECTING FUNCTION

TECHNICAL FIELD

The present invention relates to a cooking appliance which measures the weight of food which is an object to be heated and thereby enables automatic calculation of the heating time, output, pattern, etc. in accordance with the measured weight.

BACKGROUND ART

When cooking food by heating it with a general cooking appliance, the food is weighed by a balance or the like, and, based on the measured weight, the heating time and the heating output are preset by the use of a rotary timer or output setting keys and so forth. This requires troublesome operations such as, particularly, weighing, setting of the timer and the heating output, etc. before starting the cooking operation and therefore an improvement which will permit easier operation has been desired.

Further, recently, there have been developed automatic cooking appliances equipped with an infrared ray sensor for detecting the surface temperature of the food and a humidity sensor and a gas sensor for detecting water vapor, alcohol, etc. produced from the food to detect the heating condition and the cooked state of the food, thereby effecting automatic cooking. However, with such an automatic cooking appliance, the sensors detect mainly the heating condition of the surface of the food. For this reason, the cooking condition varies depending on the weight of the food, and, especially when the food occupies a large volume, there occurs a great difference in the temperature between the center portion and the surface of the food, thereby giving rise to a variation in the cooked state of such food.

Improvements in this respect have been necessary, and, to serve this purpose, automatic measurement of the weight of the food has been desired The invention (Japanese patent application No. 44286 of 1982), which the present inventor made to attain the aforementioned purpose, was directed to a high frequency heating device in which vibrating means using a spring is provided on a turntable which rotates with food placed thereon, and the weight of the food is detected by transmitting the vibration of the vibrating means to the outside of the heating chamber by means of magnetic coupling so that, in accordance with the weight of the food thus detected, the output from the high frequency oscillator and the heating mode and the heating time are controlled. However, it was necessary to improve the above-mentioned device to elevate its performance.

DISCLOSURE OF THE INVENTION

In view of this background, this invention provides a heating cooking appliance for effecting automatic measurement of the weight of food and besides for realizing the means therefor inside the heating chamber. Further, by transmitting the weight information to the outside of the heating chamber contactlessly, this invention intends to eliminate any particular protrusion or hole in the heating chamber for use in the transmission of the weight information and to promote the operability and ease of using the heating cooking appliance Thus, the cooking appliance of this invention comprises a heating chamber for accommodating the food, a heat source for supplying heating energy to the interior of the aforementioned heating chamber, a turntable having a Roberval mechanism whose vibration frequency varies depending on the weight of the food, and a circuit for calculating the weight of the food to be heated from the vibration frequency of the turntable which has been transmitted to the outside of the heating chamber through magnetic coupling. For the transmission of the vibration frequency through magnetic coupling, a magnet and a yoke made of a ferromagnetic material are used, and a coil is provided in a detecting section, and a portion of the heating chamber above the coil at the center of the heating chamber is protruded so that the coupling between the coil and the magnet and yoke may be tightened, thereby ensuring accurate detection of the vibration signal. A transformer or motor may generate magnetism during the heating operation, so that the energization of such a device is stopped when detecting the weight of the food. Since the vibration signal thus detected includes noise such as electromagnetic waves in addition to the information signal from the turntable, a filter circuit for removing noise is provided.

Besides, there is provided a circuit for controlling the output from the heating source and the heating time, etc. depending on the detected weight of the food to be heated. Thus, this invention simplifies the operation of the cooking appliance and enhances convenience of use of the cooking appliance, and at the same time this invention provides means for measuring the weight of the food placed in the heating chamber, thereby making it possible to delete the weighing operation before the start of the cooking operation and to effect efficient cooking. In another type of application, the appliance of this invention makes it possible to attain nice and finely adjustable automatic cooking through a combination thereof with other sensors.

MOST PREFERABLE EMBODIMENTS FOR WORKING THE INVENTION

Figure 1:
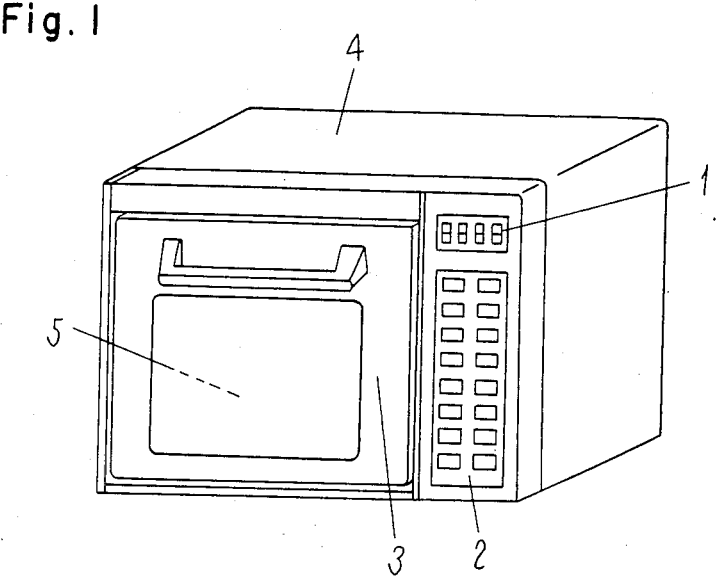
FIG. 1 is a perspective view of the cooking appliance having a weight detecting function of an embodiment of this invention.

Referring to FIG. 1, the weight of food to be heated and the heating time are indicated in the indicating section 1, and various types of keys for selecting the pattern of the cooking, the heating output, etc., for setting the heating time, and for starting the cooking operation are arranged in the setting section 2. For transferring the food into and out of a heating chamber 5, a door 3 is arranged to be opened and closed as desired. Numeral 4 designates the appliance in general.

Figure 2:
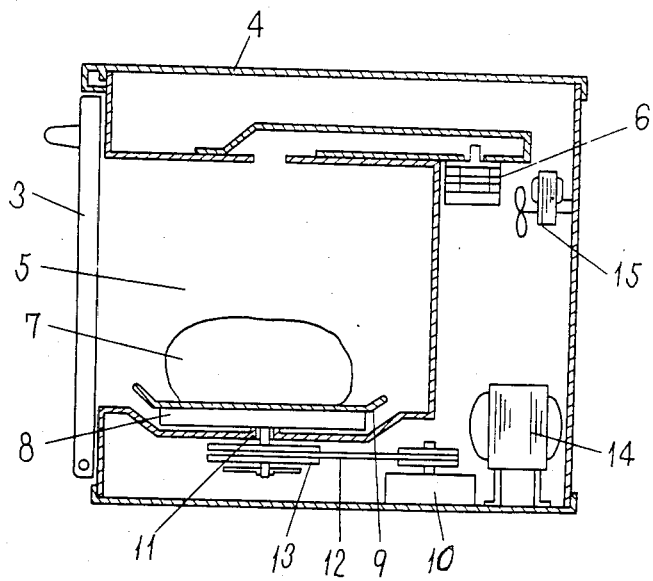
FIG. 2 is a side sectional view of the cooking appliance.

Referring to FIG. 2, a magnetron 6 is disposed as a heat source for the heating chamber 5. A turntable 8 is constructed to carry food 7 thereon and to be rotatable to prevent uneven heating, and it includes a spring whose vibration frequency changes depending on the weight of the food 7. A turntable motor 10 is arranged to turn the turntable 8. The vibration of the turntable 8 is transmitted magnetically to the outside of the heating chamber 5 and a detecting coil 11 is provided for detecting a magnetic signal thereby produced. Numeral 9 denotes a plate as a vessel for the food. The turning torque of a turntable motor 10 is transmitted to a pulley 13 by way of a belt 12 to turn the turntable 8. Numeral 15 designates a fan motor for cooling the magnetron 6, and 14 a high tension transformer.

Figure 3:
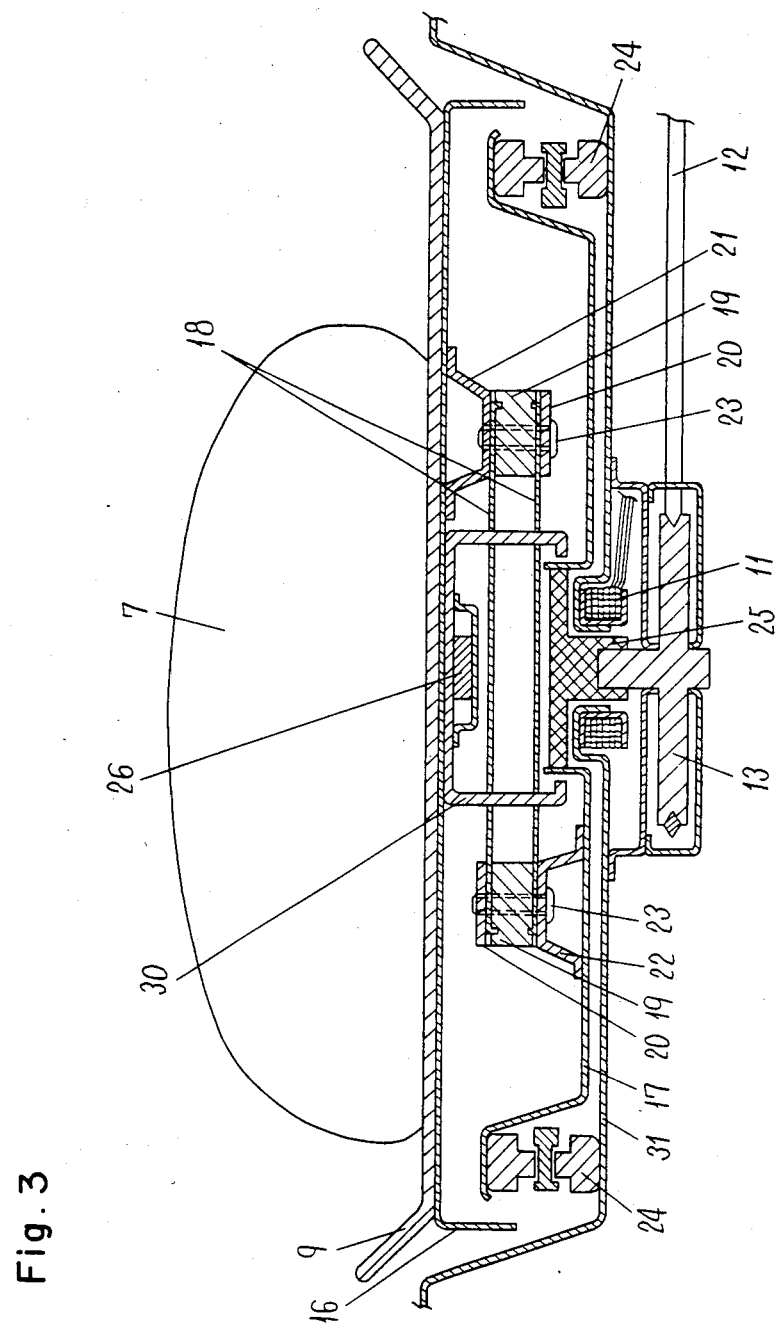
FIG. 3 is an enlarged sectional view of the weighing section of the cooking appliance.

FIG. 3 shows the structure of the turntable 8 and the vibration frequency detecting section. The turntable 8 is composed of two tables, i.e., an upper table 16 and a lower table 17, and these two tables 16 and 17 are coupled to each other through two leaf springs 18. The two leaf springs 18, when they are positioned horizontally, are inserted between an upper table supporting fixture 21 and a lower table supporting fixture 22 with spring spacers interposed therebetween, and they are fastened by bolts 23 between spring retaining fixtures 20 and the upper and lower table supporting fixtures 21 and 22, respectively. This mechanism is well known as a Roberval mechanism. This structure allows the upper table 16 and the lower table 17 to shift in parallel with each other, and this parallel state may be maintained independently of the mounting position of the food. This is very important in the mounting of the food.

The upper table supporting fixture 21 is bonded to the upper table 16, and the lower table supporting fixture 22 is bonded to the lower table 17, respectively, by spot welding, etc.

The lower table 17 is supported by rollers 24 to be rotatable. The pulley 13 receives the turning torque from the turntable motor through the belt 12 to turn the turntable 8 and transmits the turning torque to the center of the turntable 8 by being engaged therewith through a shaft 25 which is made of a resin.

With the above-described structure, the portion above the leaf springs 18, which is coupled to the upper table 16, vibrates and this vibration frequency varies with a change in the weight of the food 7. That is, the heavier the food 7, the lower the vibration frequency becomes, and vice versa.

Further, magnetic coupling is utilized as means for transmitting the vibration frequency functioning as the weight information to the outside of the heating chamber 5. That is, a magnet 26 is disposed at a portion connected to the upper table 16 and a change in the magnetic field caused by the vibration of the magnet 26 is detected by the detecting coil 11. Thus, the vibration of the magnet 26 causes a change in its position relative to the detecting coil 11, resulting in variations in the magnetic field at the detecting coil 11. Then, the electromotive force is generated in the detecting coil 11 due to the variations in the magnetic field, and the vibration frequency conveyed by this electric signal is processed by the electronic circuits.

Figure 4:
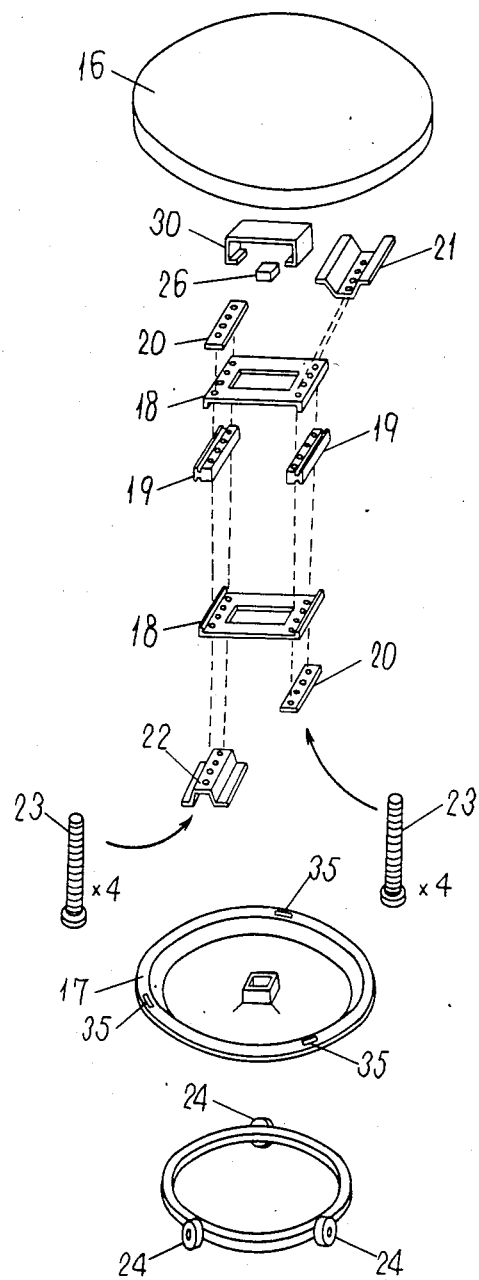
FIG. 4 is an exploded perspective view of the weighing section of the cooking appliance.

FIG. 4 is an exploded perspective view of the turntable 8 shown in FIG. 3 for illustrating its structure.

Figure 5:
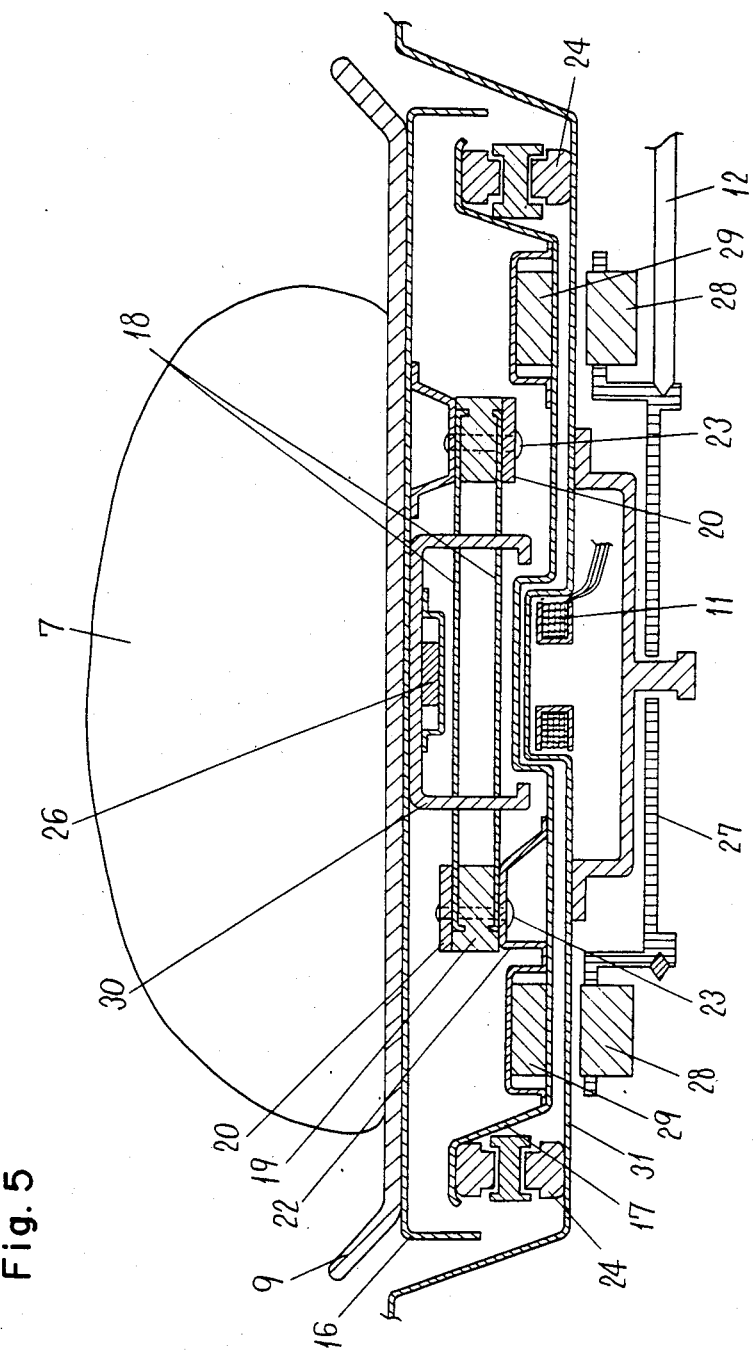
FIG. 5 is an enlarged sectional view of the weighing section of the magnet type turntable in which the driving torque for the turntable is applied through a magnetic force.

FIG. 5 shows another turntable in which the system for transmitting the driving torque of the turntable is different from that shown in FIG. 3, however, the structure of the other vibrating section and detecting section are the same as those shown in FIG. 3. In the system of FIG. 3, the turning torque is transmitted to the turntable 8 through the rotary shaft 25, while, in the structure shown in FIG. 5, a rotary drive magnet 28 is mounted on a magnet carrying pulley 27 to turn the turntable 8. Then, the turning torque is transmitted to the turntable 8 by the attractive force between an upper rotary drive magnet 29 mounted on the lower table 17 and the lower rotary drive magnet 28.

Figure 6A:
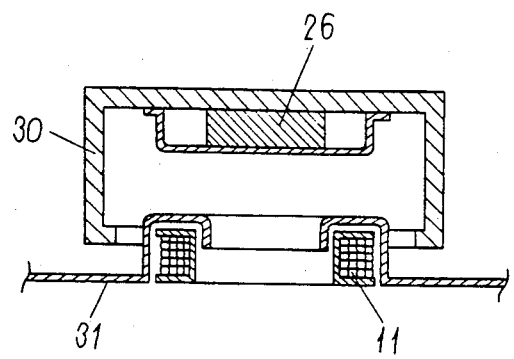
FIGS. 6(a) and (b) are sectional views showing the vibration detecting section.
Figure 6B:
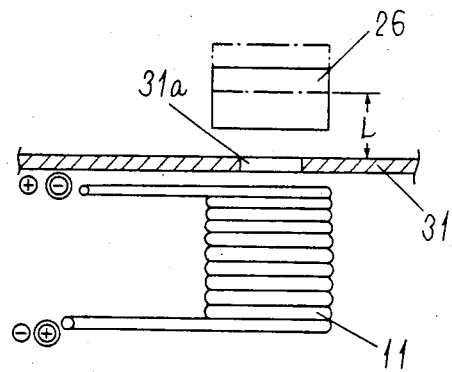

FIG. 6(a) shows the positional relation between the magnet 26 fixed onto the upper table 16 and the vibration detecting section composed of a yoke 30 made of a ferromagnetic material and the detecting coil 11. The magnetic force from the magnet 26 is led to the detecting coil 11 through the yoke 30, and further the magnetic force applied to the detecting coil 11 is further increased by raising a part of the heating chamber bottom plate 31 at the position of the detection coil 11, thereby increasing the signal transmitted by the magnetic coupling. FIG. 6(b) shows the positional relation of the signal system at this time. As the distance L between the magnet 26 and the detecting coil 11 changes, an AC electromotive force is produced in the detecting coil 11. With the heating chamber bottom plate 31 made of a material which interrupts microwave energy but passes the magnetic field, a change in the magnetic field indicative of the vibration frequency may be detected by the vibration detecting section without being affected by the microwave energy. Though, at the center of the heating chamber bottom plate 31, there is provided a hole 31a necessary for transmitting the turning torque to the turntable 8, the size of the hole 31a may be made substantially smaller than the wave length of the microwave energy so that it has no relation to the leakage of microwave energy.

Figure 7A:
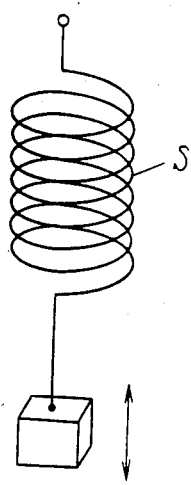
FIGS. 7(a) and (b) are structural diagrams illustrating the principle of the vibration of the springs.

FIG. 7(a) illustrates how vibration takes place when a weight is attached to the coil spring S. Assuming the modulus of elasticity of the spring S to be k and the mass of the weight m, the vibration frequency f is given by $$f = \frac{1}{2\pi} \sqrt{\frac{k}{m}}.$$

Figure 7B:
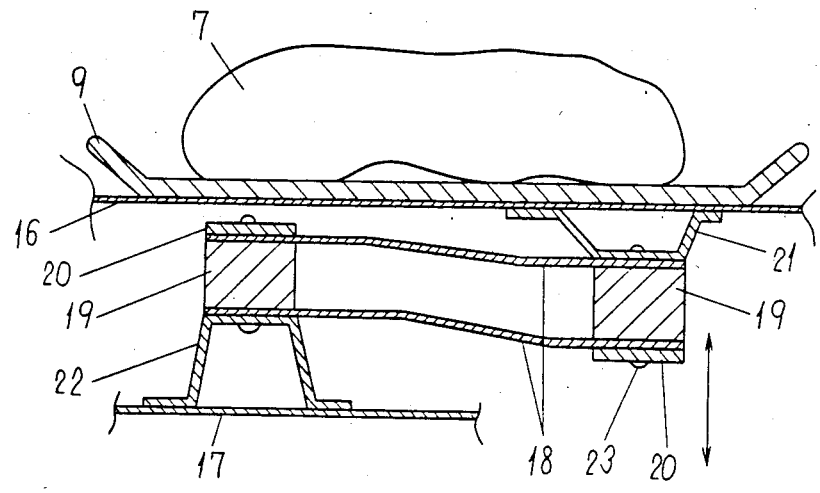

Therefore, as the mass increases, the vibration frequency decreases. Accordingly, a similar relation holds when the leaf springs 18 are utilized as shown in FIG. 7(b). Thus, by making use of this relation, it is possible to calculate the weight.

Actually, the measurement is made of a period T, which is the reciprocal of the frequency, so that the weight may be converted from the period. Namely, the relation of f=1/T is substituted into the relation of $$f = \frac{1}{2\pi} \sqrt{\frac{k}{m}},$$

from which the equation for determining the weight $$m = \left(\frac{1}{2\pi}\right)^2 kT^2$$

results, which equation is a quadratic equation in terms of T.

Figure 8:
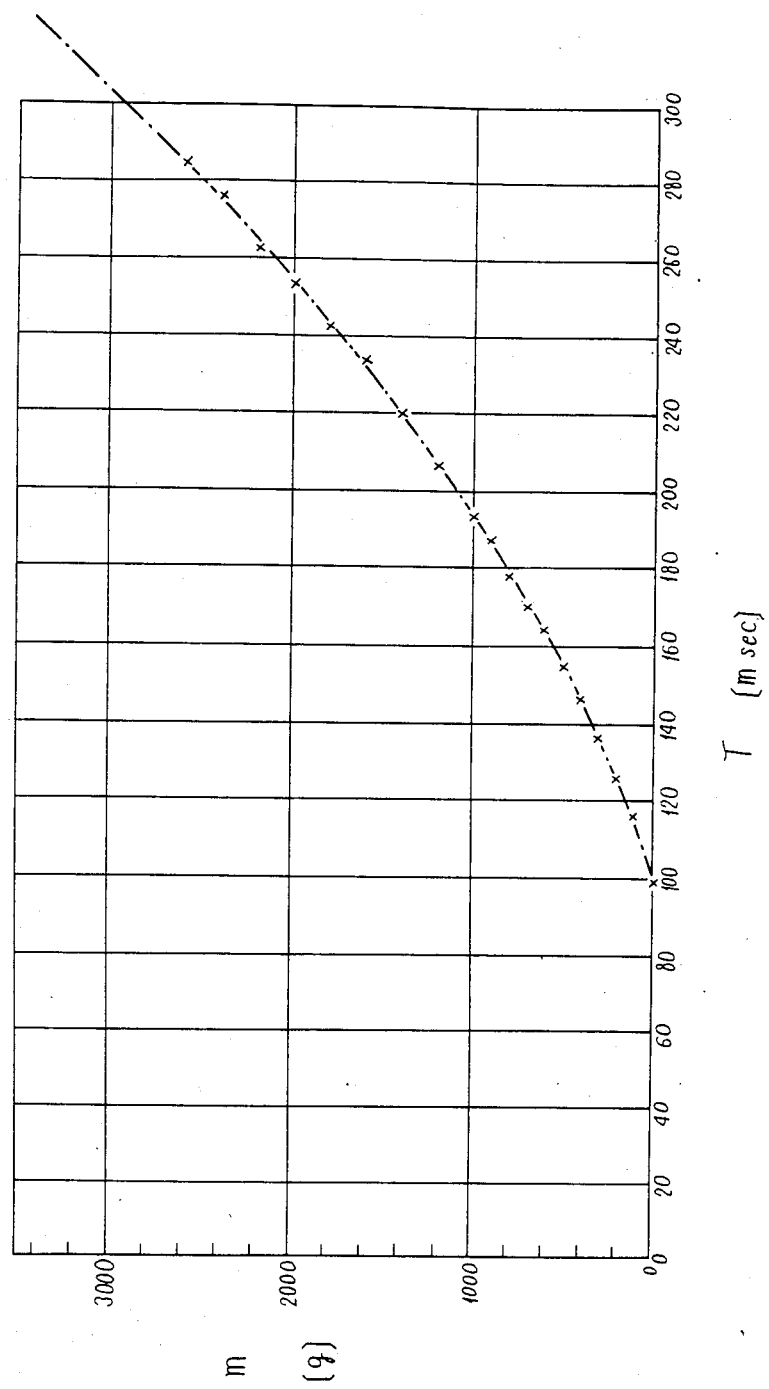
FIG. 8 is a characteristic diagram showing the relation between the period and the weight in this embodiment.
Figure 9A:
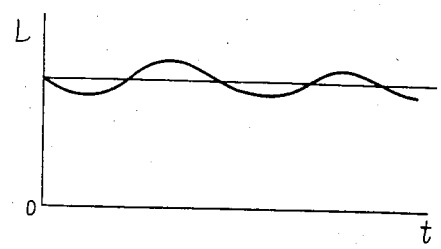
FIGS. 9(a), (b), (c) and (d) are characteristic diagrams showing the relation between the respective parts of the weighing section.
Figure 9B:
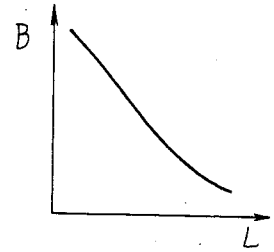
Figure 9C:
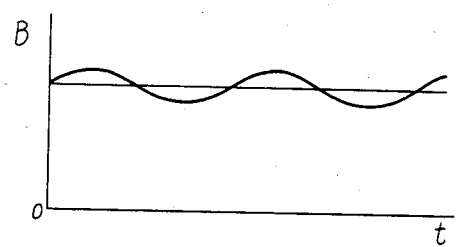
Figure 9D:
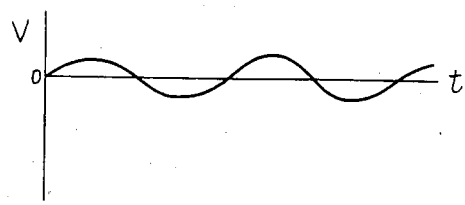

In an actual conversion equation, a state, in which the upper table 16 in the vibrating section, the upper table supporting fixture 21, etc. are provided initially, is assumed to be 0 g. Besides, air resistance, etc. are also involved during the vibrating movement. Accordingly, m is represented by a quadratic equation $m = C_1 T^2 + C_2 T + C_3$, where $C_1$, $C_2$ and $C_3$ are constants. FIG. 8 is a graph showing the relation between the period and the weight in an embodiment of this invention. Thus, by storing this quadratic equation in a microcomputer, it is possible to calculate the weight after measuring the period T.

FIG. 9 shows relations between respective portions when the leaf springs 18 are vibrating. FIG. 9(a) shows a change with time in the distance L between the magnet 26 and the detecting coil 11 when the leaf springs 18 vibrate. FIG. 9(b) shows the relation between the distance L and the magnetic field B at the detecting coil 11. FIGS. 9(c) shows a change with time in the magnetic field B due to the vibration of the leaf springs 18 at the detection coil 11 which is derived from FIG. 9(a) and FIG. 9(b). FIG. 9(d) shows the electromotive force produced in the detecting coil 11 due to the change in the magnetic field B shown in FIG. 9(c).

Figure 10:
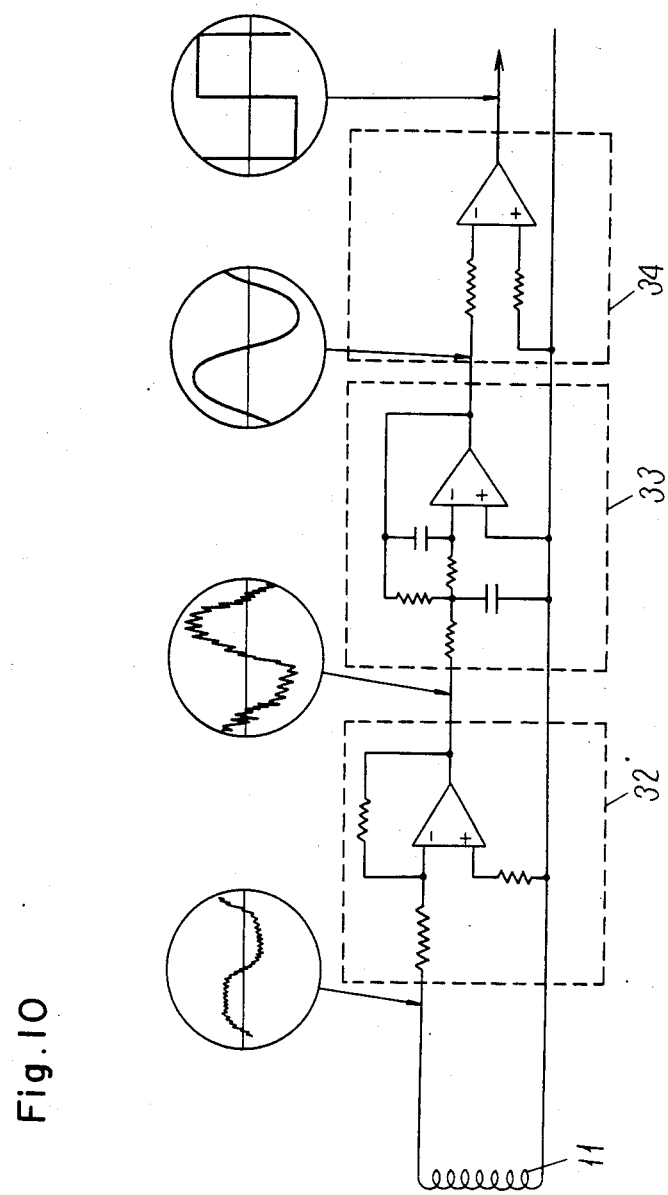
FIG. 10 is a block diagram showing the signal processing circuits for processing the output signal from the coil.

FIG. 10 shows an example of an electronic circuit for processing the electric signal produced in the detecting coil 11 by the vibrating movement. The electric signal produced is small and has been influenced by other electromagnetic waves. Firstly, the electric signal is amplified by an amplifier circuit 32. Then, in order to get rid of the influences from electromagnetic waves, etc., a filter circuit 33 is used. The vibration frequency is as low as about 1–100 Hz, while, the electomagnetic waves are generally not lower than 1 kHz. Thus, in this case, a low pass filter is used. The output signal which has passed through the filter circuit 33 is further reshaped into a square wave through a waveform shaping circuit 34, and then the output signal is processed.

Figure 11A:
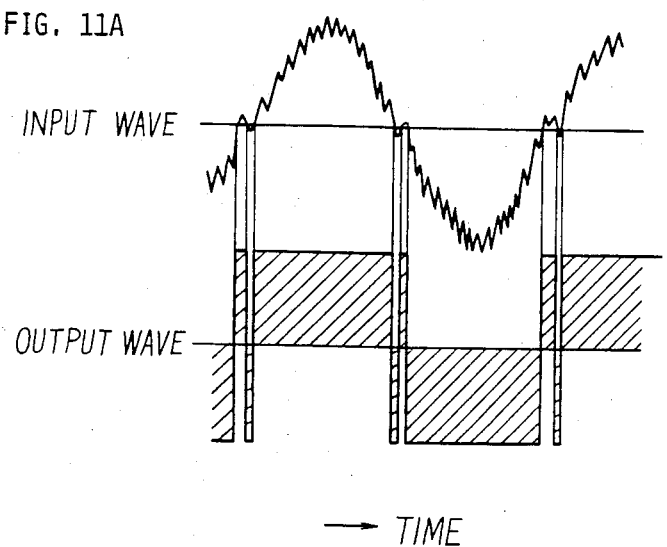
FIGS. 11(a) and (b) are characteristic diagrams showing the output waveform from the waveform shaping circuit with and without using the filter circuit.
Figure 11B:
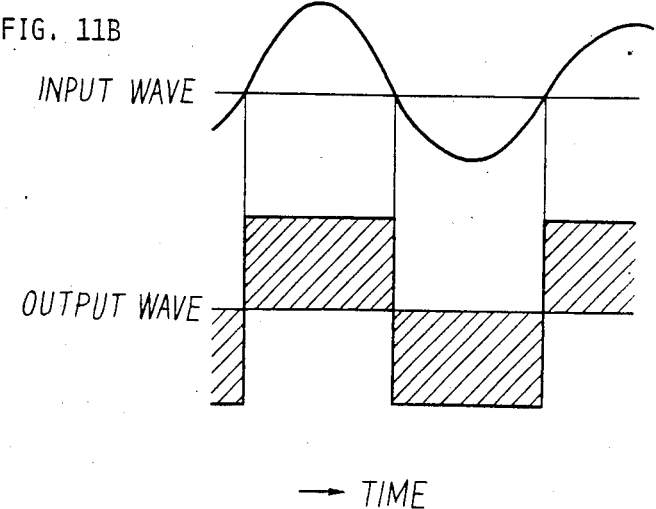

With reference to FIG. 11, the reason why the filter circuit 33 is necessary is explained. The waveforms shown there are the input and output waveforms of the waveform shaping circuit 34. FIG. 11(a) shows a waveform when the filter circuit 33 is not used. If the electric signal is affected by the electromagnetic waves in this case, the output from the waveform shaping circuit will become unstable, and the processing of the electric signal becomes difficult. On the other hand, FIG. 11(b) shows a waveform in which the effect of the electromagnetic wave is eliminated by the use of the filter circuit 33. The output waveform becomes stable, and the processing of the electric signal becomes possible.

Figure 12A:
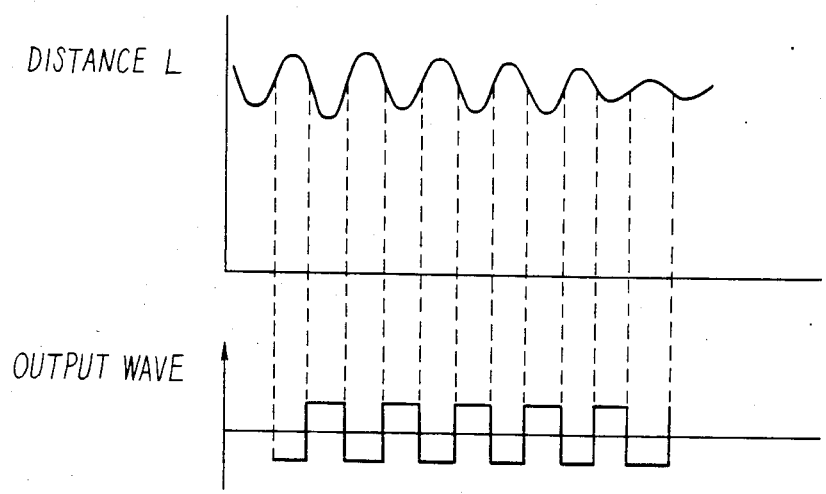
FIGS. 12(a) and (b) are characteristic diagrams showing the relation between the weight and the vibration frequency.
Figure 12B:
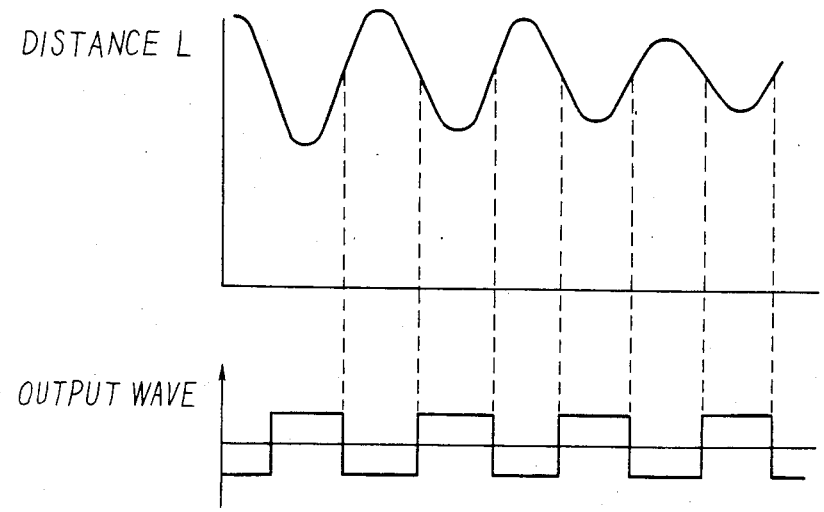

FIG. 12 shows the relation between the vibration of the leaf springs 18 and the output waveform from the waveform shaping circuit 34. It is seen that the vibration frequency differs depending on the weight of the food. From the comparison between FIG. 12(a) and FIG. 12(b), it is seen that the frequency of FIG. 12(a) is higher than that of FIG. 12(b), and, therefore, the weight of the food of FIG. 12(a) is smaller.

Figure 13A:
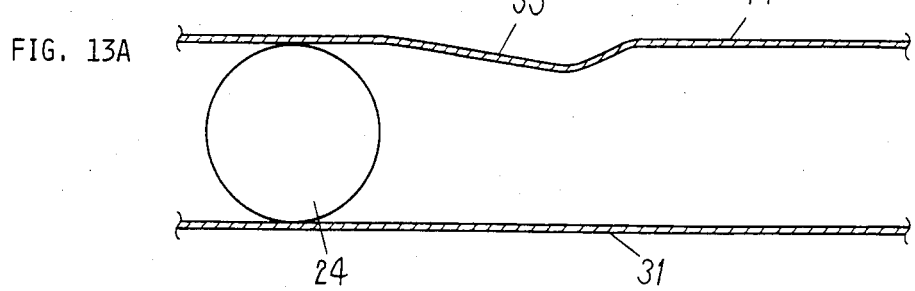
FIGS. 13(a), (b) and (c) are explanatory diagrams for explaining the principle of the method of producing vibration by turning the turntable.
Figure 13B:
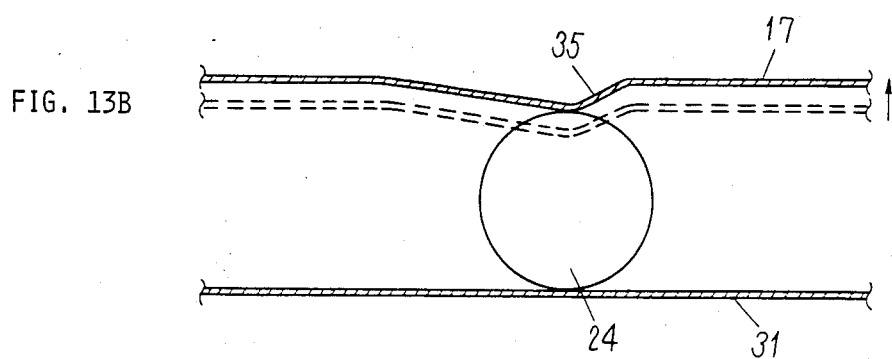
Figure 13C:
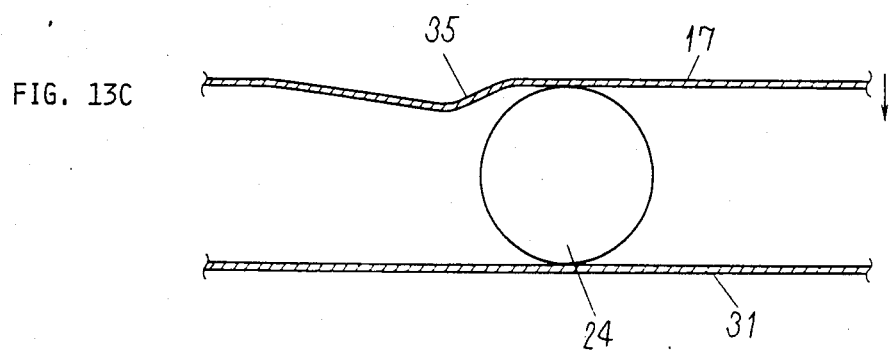

Then, it is necessary to cause the vibration to occur with sufficient stability. Various methods are available here. FIG. 13 shows the principle of a method of generating the vibration by making use of the rotation of the turntable 8. A roller 24 is arranged between the heating chamber bottom plate 31 and the lower table 17, and the lower table 17 is turning on the roller 24. In FIG. 13(a), the lower table 17 is turning by being supported by the roller 24 at a flat portion of the lower table 17, and, therefore, it is turning in parallel with the heating chamber bottom 31. In FIG. 13(b), the lower table 17 is supported by the roller 24 at the vibration generating step 35 of the lower table 17, so that the turntable 8 is raised as a whole. Then, as shown in FIG. 13(c), the roller 24 leaves the vibration generating step 35, and, as a result, the turntable 8 falls down onto the level shown in FIG. 13(a). This motion gives rise to the vibrating movement of the turntable 8, and the portion on the side of the upper table 16 above the leaf springs 18 vibrates. In this way, by making use of the rotation of turntable 8, stable vibration of the turntable 8 may be generated.

Further, it should considered that, while detecting the vibration, other devices which generate a magnetic field, for example, the high tension transformer 14, fan motor 15, etc., may generate a magnetic field when they are in operation. Therefore, due to the influence of such a magnetic field on the detecting coil 11, it is not possible for the detecting coil 11 to generate a correct vibration signal. For this reason, the weight measurement is made after the oscillation of the magnetron 6 has been stopped. Alternatively, by arranging a magnetic shielding plate between the devices, which generate a magnetic field, and the detecting coil 11, it is possible to detect the weight of the food while allowing these devices to continue operating.

Figure 14:
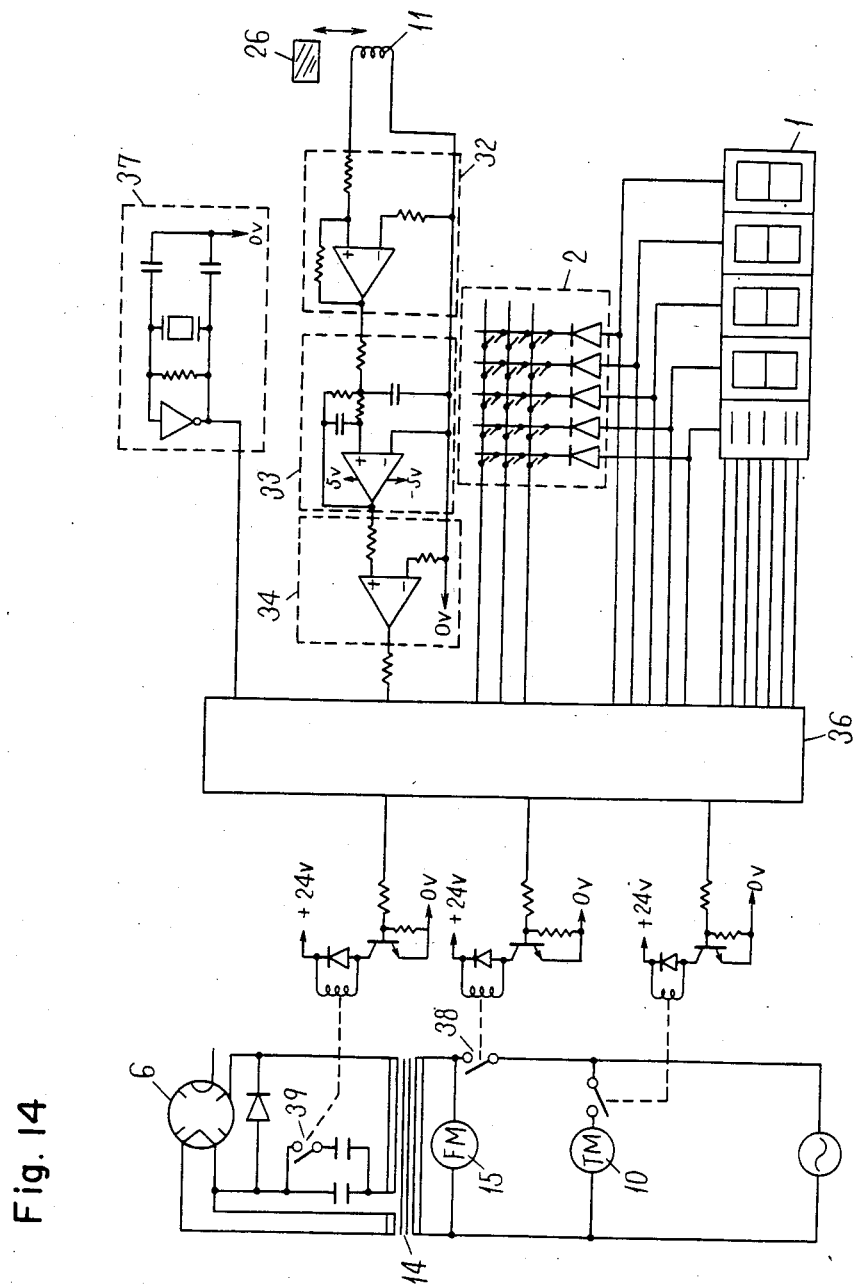
FIG. 14 is a circuit diagram of an electronic range of an embodiment of this invention.

FIG. 14 shows a control circuit of the electronic range of an embodiment of this invention. Numeral 36 designates a microcomputer which performs the storing, judgment, processing, and inputting and outputting of data, etc. Numeral 37 designates an oscillator circuit which generates a signal of a reference frequency which is used to measure the vibration of the turntable 8. The magnetron 6 generates a high frequency wave, and the fan motor 15 operates to cool the magnetron 6. Numeral 38 designates a power supply relay for supplying electric power to the magnetron 6, and numeral 39 an output control relay for controlling the output power from the magnetron 6.

Figure 15A:
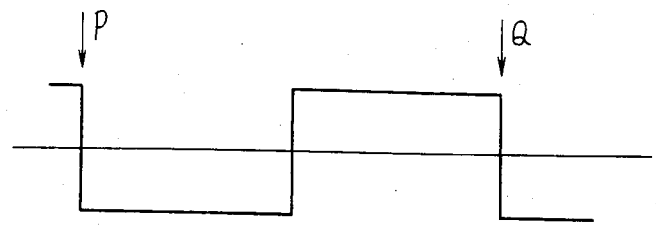
FIGS. 15(a) and (b) are explanatory diagrams for inputting the frequency and converting the input frequency to the weight.
Figure 15B:
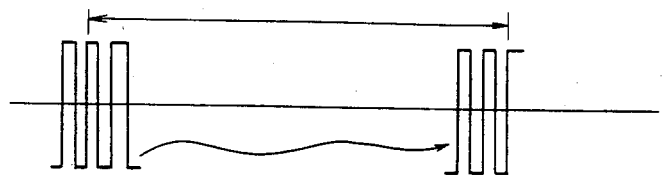
FIG. 15(c) is a flow chart for this process.
Figure 15C:
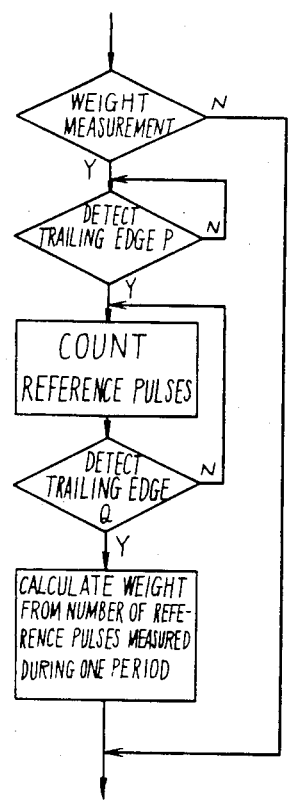

FIG. 15 shows the operation of the weight measurement. FIG. 15(a) shows a pulse signal derived from the vibration of the leaf springs 18. FIG. 15(b) shows the waveform of an output signal from the oscillator circuit 37. FIG. 15(c) shows a flowchart for the measuring operation. Thus, referring to FIG. 15(a) which shows the pulse signal indicative of the vibration of the leaf springs 18, the number of reference pulses generated by the oscillator circuit 37 during a time period between the trailing edge P and the next trailing edge Q of the pulse signal derived from the vibration of the leaf springs 18 is counted, and it is possible to determine the frequency of the leaf springs 18 from the counted number of reference pulses.

As described, the weight of the food can be measured in the heating chamber, and besides, by making use of magnetic coupling, the signal obtained by the measurement can be transmitted easily to the outside of the heating chamber, yet without being affected by microwaves. With regard to the precision of the measurement, the measurement includes errors caused only by the modulus of elasticity of the leaf springs and by the oscillator circuit, but it is entirely free from the influence of the irregularity and error occurring in the circuits.

Then, the heating output, time, pattern, etc. corresponding to the measured weight are calculated by the microcomputer.

Figure 16A:
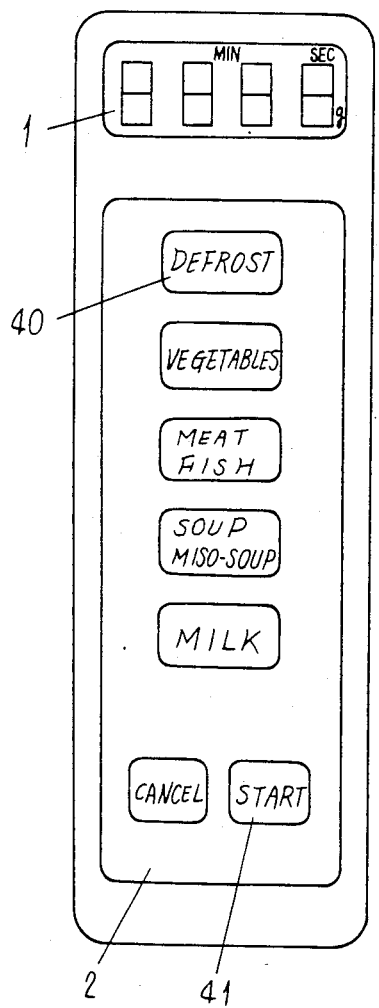
FIGS. 16(A) and (B) are respectively a front view of the setting section of this electronic range and an explanatory diagram showing the states of the indication thereof.
Figure 16B:
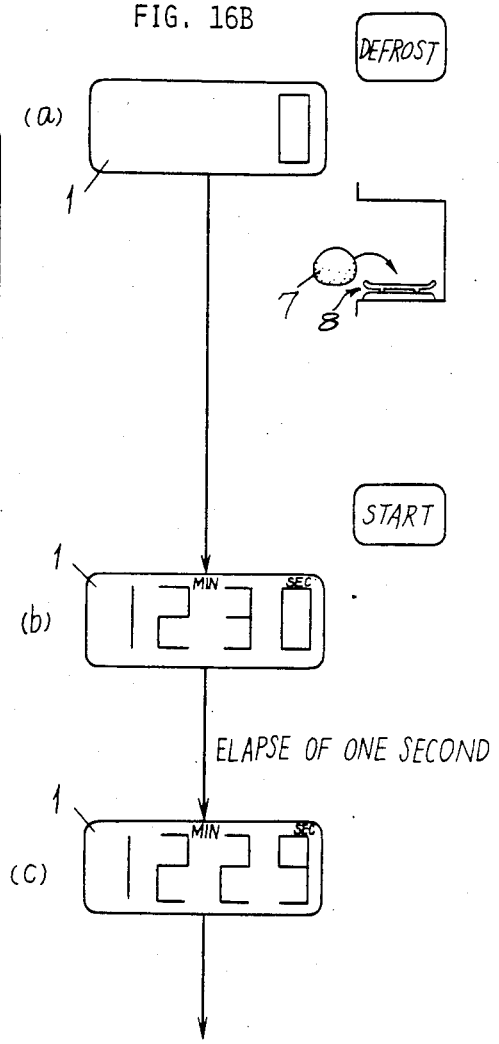

Referring to FIG. 16, the operation of the electronic range of this embodiment is explained by way of an example. FIG. 16(A) shows an example of the indicating section 1 and the setting section 2, respectively. In the setting section 2, there are provided selection keys for selecting the cooking menu, and, from the selected menu and the measured weight of the food, the heating time, the heating output and the heating pattern are determined. Now, the operation of this embodiment is described taking the defrosting operation of the frozen food as an example. As the DEFROST key 40 in the setting section 2 is depressed, firstly "0" is indicated on the indicating section 1 as shown at (a) in FIG. 16(B). Next, the frozen food is put on the turntable 8 inside the heating chamber.

Then, the COOKING START key 41 is depressed. Thereupon, the vibrating movement is produced by the rotation of the turntable 8, and, in accordance with the result of the measurement of the vibration frequency (the period of vibration), the microcomputer 36 calculates the weight of the food. Further, the microcomputer 36 calculates the heating time T corresponding to the weight of the food and indicates it on the indicating section 1 as shown at (b) in FIG. 16(B), and thereafter it indicates the remaining heating time as shown at (c) in FIG. 16(B).

Figure 17A:
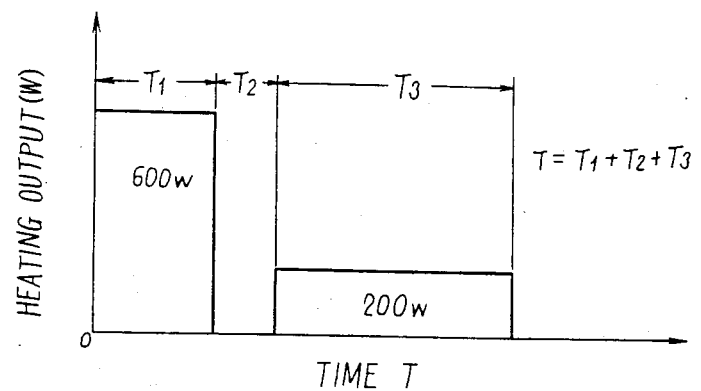
FIGS. 17(a) and (b) are characteristic diagrams illustrating the conversion process for determining the heating conditions for defrosting.
Figure 17B:
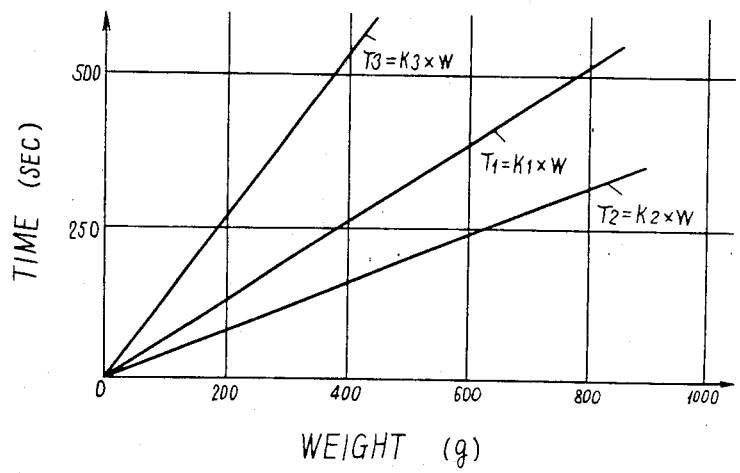

Further, the heating output P, the heating time T and the heating pattern at the time of defrosting the food are shown by way of example in FIG. 17(a) and (b). These data are stored in the microcomputer 36, and after the COOKING START key 41 has been operated, the defrosting operation proceeds automatically, and then, after the lapse of a predetermined time, the high frequency oscillation is stopped and the defrosting operation is completed. FIG. 17(a) shows that the heating operation is performed for $T_1$ sec at the heating output of 600 W, suspended for the following $T_2$ sec, and then resumed to continue for the following $T_3$ sec at the heating output of 200 W. Further, FIG. 17(b) shows the relation between the respective times $T_1$, $T_2$ and $T_3$ and the weight W in g of the food.

FIELD OF INDUSTRIAL APPLICATION

As described hereinabove, according to this invention, the leaf springs whose vibration frequency changes depending on the weight of the food to be heated incorporated in the turntable and the vibration signal is transmitted to the outside of the heating chamber by means of magnetic coupling. Accordingly, by merely putting the food on the turntable inside the heating chamber, the measurement of the weight of the food can be made automatically. Then in correspondence with the measured weight, the heating time, output and pattern are automatically controlled, thereby enabling highly convenient and finely adjustable cooking. Besides, a combination thereof with other sensors makes it possible to improve the performance of automatic cooking.

LIST OF REFERENCE NUMERALS IN THE DRAWINGS

1 ... Indicating section,
2 ... Setting section,
3 ... Door,
4 ... Appliance in general,
5 ... Heating chamber,
6 ... Magnetron,
7 ... Food,
8 ... Turntable,
9 ... Food plate
10 ... Turntable motor,
11 ... Detecting coil,
12 ... Belt,
13 ... Pulley,
14 ... High tension transformer,
15 ... Fan motor,
16 ... Upper table,
17 ... Lower table,
18 ... Leaf springs,
19 ... Spring spacer,
20 ... Spring retaining fixture,
21 ... Upper table supporting fixture,
22 ... Lower table supporting fixture,
23 ... Bolt,
24 ... Roller,
25 ... Rotary shaft,
26 ... Magnet,
27 ... Magnet carrying pulley,
28 ... Lower rotary drive magnet,
29 ... Upper rotary drive magnet,
30 ... Yoke,
31 ... Heating chamber bottom plate,
31a ... Hole,
32 ... Amplifier circuit,
33 ... Filter circuit,
34 ... Waveform shaping circuit,
35 ... Vibration generating step,
36 ... Microcomputer,
37 ... Oscillator circuit,
38 ... Power supply relay,
39 ... Output control relay,
40 ... DEFROST key,
41 ... COOKING START key.

I claim:

1. A heating cooking appliance having a weight detecting function and devices for generating a magnetic field including at least a high tension transformer and a fan motor, said appliance comprising a heating chamber for accommodating and heating food;

a heat source for heating the food;

a table for mounting the food thereon;

spring means attached to said table and having a vibration frequency which varies depending on the weight of the food mounted on said table;

means for detecting the vibration frequency of said table which is generated when the food is mounted on said table by converting the vibration of said table into a change in a magnetic field;

a control circuit for calculating the weight of the food from a result of the detection of the vibration frequency of said table and controlling the heating output, heating pattern and heating time of said heat source in accordance with the calculated weight of the food; and deenergizing means for deenergizing said devices for generating a magnetic field while the weight of the food is being detected, whereby an undesirable magnetic influence on said detecting means is prevented.

2. A heating cooking appliance having a weight detecting function and devices for generating a magnetic field including at least a high tension transformer and a fan motor, said appliance comprising a heating chamber for accommodating and heating food;

a heat source for heating the food;

a table for mounting the food thereon;

spring means attached to said table and having a vibration frequency which varies depending on the weight of the food mounted on said table;

means for detecting the vibration frequency of said table, which is generated when the food is mounted on said table, by converting the vibration of said table into a change in a magnetic field;

a control circuit for calculating the weight of the food from a result of the detection of the vibration frequency of said table and controlling the heating output, heating pattern and heating time of said heat source in accordance with the calculated weight of the food; and magnetic shielding means disposed between said vibration frequency detecting means and said devices for generating a magnetic field, said magnetic shielding means preventing an undesirable magnetic influence on said detecting means.

3. A heating cooking appliance having a weight detecting function comprising a heating chamber for accommodating and heating food;

a heat source for heating the food;

a table which mounts the food thereon and whose vibration frequency varies depending on the weight of the food;

means for detecting the state of the vibration of said table which is generated when the food is mounted on said table; and a processing section for calculating the weight of the food from a result of the detection of the state of the vibration of said table and processing and controlling the heating output, heating pattern and heating time of said heat source in accordance with the calculated weight of the food, said processing section employing a calculating equation for calculating the weight of the food which includes a quadratic equation $m = C_1 T^2 + C_2 T + C_3$, where m denotes the mass of the food, T the period of the vibration, and $C_1$, $C_2$ and $C_3$ are constants.

* * * * *